March 17, 1953     S. HILLER, JR     2,631,676
JET-PROPELLED HELICOPTER WING CONSTRUCTION
Filed Dec. 27, 1949     7 Sheets-Sheet 2

INVENTOR.
STANLEY HILLER, JR.
BY
ATTORNEY

March 17, 1953  S. HILLER, JR  2,631,676
JET-PROPELLED HELICOPTER WING CONSTRUCTION
Filed Dec. 27, 1949  7 Sheets-Sheet 3

INVENTOR.
STANLEY HILLER, JR.
BY Charles M. Fryer
ATTORNEY

Fig. 6.

INVENTOR.
STANLEY HILLER, JR.
BY
ATTORNEY

Patented Mar. 17, 1953

2,631,676

UNITED STATES PATENT OFFICE 2,631,676

JET-PROPELLED HELICOPTER WING CONSTRUCTION

Stanley Hiller, Jr., Menlo Park, Calif., assignor to Hiller Helicopters, San Mateo County, Calif., a corporation of California Application December 27, 1949, Serial No. 135,151

22 Claims. (Cl. 170—135.4)

This invention relates to helicopters and more particularly to a jet propelled helicopter rotor.

In prior jet propelled helicopter arrangements, it is common to provide a jet pulse motor at the tip or outboard end of each rotor blade or wing. The reaction of the jet causes rotation of the wing with consequent flight of the ship; no other power being required. Such arrangement is not at all to be desired because the great centrifugal force which exists at the tip of the wing creates problems in effecting efficacious flow of fuel to the jet motor; and special complicated carburetor systems are required to give a constant pressure flow of fuel from static conditions up to as high as 900 G. loading conditions which are frequently encountered in commercial ships at the tip of the wing when the wing is rotating at maximum speed. Also, complicated means must be associated with the wing for feeding the fuel to the motor at the wing tip.

Another disadvantage is that with the jet motor at the tip of the wing, considerable drag occurs as a result of the presence of the motor; and this drag is practically prohibitive when the rotor is under auto-rotation which occurs when the power is shut off or fails. The noise which exists with the jet motor at the tip of the wing because only a short tail pipe can be provided, is also objectionable. Furthermore, there are structural problems which present themselves in securely and fixedly supporting a jet motor at the tip of the wing because of the high centrifugal forces which exist at such location.

Summarizing this invention, it has as its object, among others, overcoming the above described problems. The invention comprises a special arrangement in which a jet pulse motor head is located at the root or inboard end of the wing structure adjacent the rotor column or shaft to thus simplify the fuel flow problem and obviate entirely the objectionable drag which would otherwise occur with the jet motor at the tip of the wing. In the construction of this invention in which the jet motor head is at the root end of the wing, such head is provided with relatively long tail piping forming part of the motor; and the tail piping is utilized to provide a main tubular spar structure for the wing which consequently has an interior longitudinally extending passageway providing the exhaust for the jet motor.

An airfoil skin is supported by the combined tubular wing spar structure and jet motor tail piping, in such manner as to provide for relative expansion and contraction between these parts to compensate for differences in expansion and contraction between such parts resulting from differences in temperature by virtue of the heat generated directly in the tail piping by the jet motor. The airfoil skin thus has a substantially floating support on the tail piping so that the airfoil contour of the skin will be substantially unaffected by changes in temperature. At the same time, the described wing structure provides a simple and light but yet sturdy construction. Because of the relatively long tail piping of the jet motor, quieter operation results compared with a jet motor at the wing tip; and the valve life of the valves in the motor head is increased because the longer the tail piping the less the number of explosion cycles per unit of time. Furthermore, the hot gases passing through such tail piping obviate entirely icing problems which may otherwise occur under certain conditions of flight.

Referring to the drawings.

Figure 1:
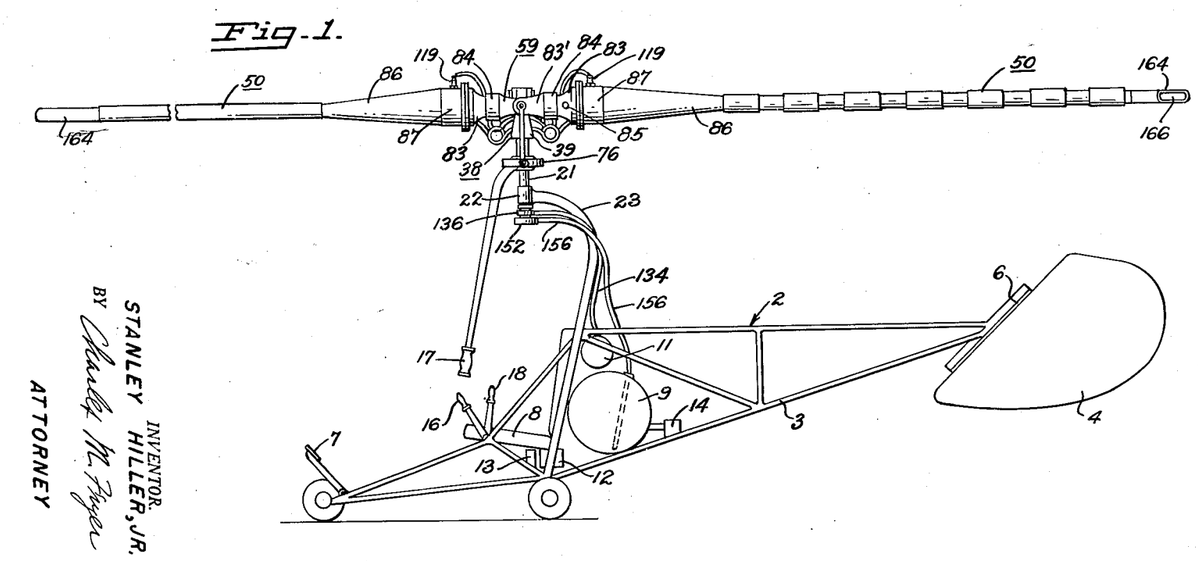
Fig. 1 is a more or less schematic side elevational view of a helicopter embodying this invention, and in which one form of wing structure is illustrated.
Figure 2:
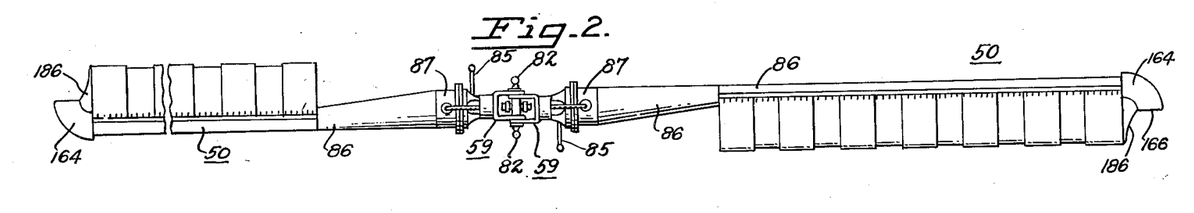
Fig. 2 is a plan view of the wing structure shown in Fig. 1.

In the embodiment of the invention chosen for purposes of illustration, body 2 of the helicopter is of any conventional construction, and comprises framework 3 having a tail rudder 4 which is pivoted at 6 for lateral movement in either direction under control of the pilot, to control the position of the body of the ship. Control of rudder 4 is effected by foot pedals 7 connected by any suitable mechanism (not shown) to the rudder, and which are manipulated by the pilot from operator's seat 8.

Mounted on body 2 are a fuel tank 9 for supplying fuel to the jet motors, a compressed air tank 11 which provides a source of compressed air employed only for starting of the motors, and an ignition system comprising battery 12 and ignition coil 13 also employed during starting of the motors. In starting of the motors, it is also necessary to pump fuel by hand; and for this purpose, a hand operable pump 14 is provided, which is controlled from the operator's station by means of pump control lever 16. An overhead control stick 17 is also positioned adjacent the operator's seat 8 for cyclic pitch control of the rotor wings or blades, and consequently control of the flight of the ship in the usual manner. For altitude control, another control lever 18 is positioned adjacent the operator's station which controls collective pitch adjusting mechanism connected to the wings in any conventional manner. The above mentioned parts are merely shown schematically as they can be of any well known type of construction.

Figures 4, 5:
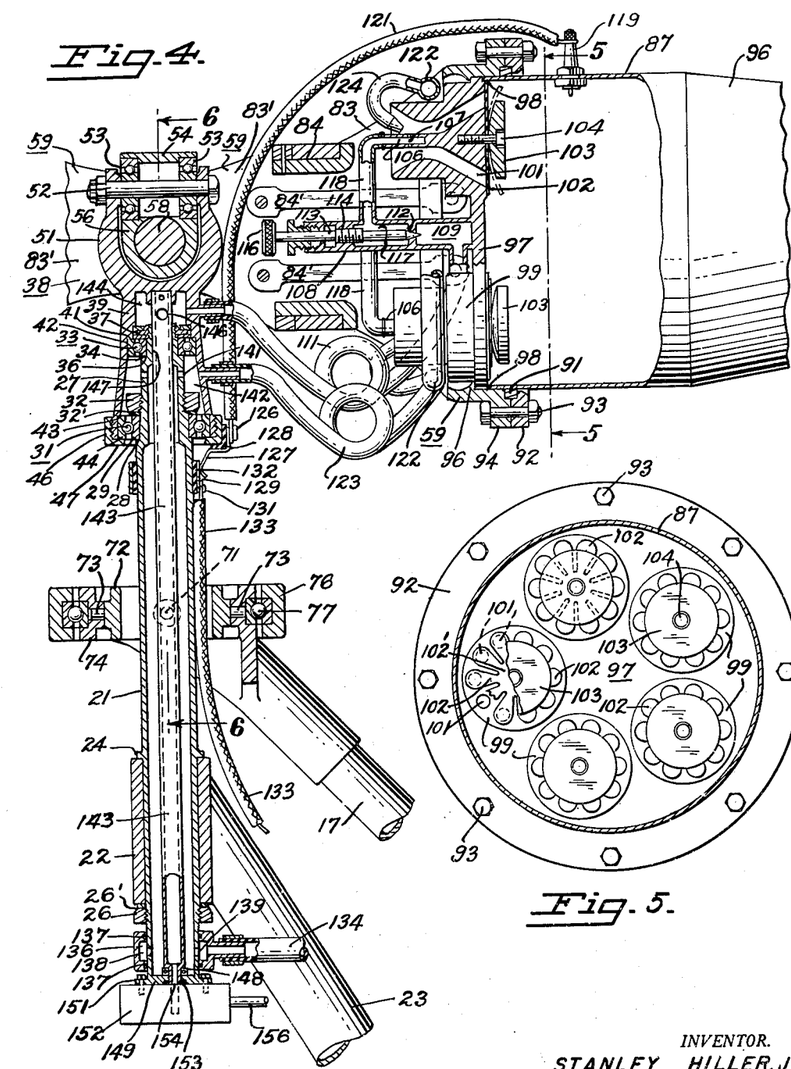
Fig. 4 is a fragmentary vertical sectional view through the rotor column, rotor head, and the root end of a wing, illustrating such arrangement in greater detail; portions of the structure being omitted for purposes of clarity.
Fig. 5 is a transverse sectional elevation taken in a plane indicated by line 5—5 in Fig. 4.

The rotor of the ship is mounted for rotation upon a stationary hollow shaft or column 21 which is fixedly supported on the ship in a sleeve 22 provided at the upper end of yoked framework 23 rigidly secured to and forming part of the body of the ship. Shaft 21 is provided with an annular flange 24 abutting the top of sleeve 22; and a nut 26 screwed onto shaft 21 abuts the lower end of sleeve 22 to effect tight clamping of flange 24 against the top end of the sleeve, and thus cause the column 21 to be rigidly held in position; a suitable lock washer 26' being provided for nut 26.

At its upper end, column 21 is provided with a reduced portion 27 which forms a shoulder 28 against which is seated the inner race 29 of bearing 31; such race being clamped against shoulder 28 by nut 32 threaded on the reduced portion 27 of column 21; a lock washer 32' being provided for nut 32. Above bearing 31 is another bearing 33, the inner race 34 of which is seated against a second shoulder 36 formed at the upper end of column 21. Inner race 34 of bearing 33 is clamped in position by means of lock nut and seal structure 37.

Bearings 31 and 33 support a rotor head 38 mounted for rotation about the axis of column 21, and upon which the rotor wings are mounted in a manner to be subsequently described. Rotor head 38 is formed with a downwardly extending sleeve portion 39 which telescopes over reduced end portion 27 of the rotor column, and which is formed with an upper shoulder 41 engaging the outer race 42 of bearing 33, and with a lower shoulder 43 engaging the outer race 44 of lower bearing 31. A nut 46 is screwed onto the lower end of sleeve 39, and has an inturned flange 47 engaging both the outer bearing race 44 and the lower end of sleeve 39 to hold the entire assembly together while at the same time permit the described rotation of rotor head 38 on bearings 31 and 33.

Figure 3:
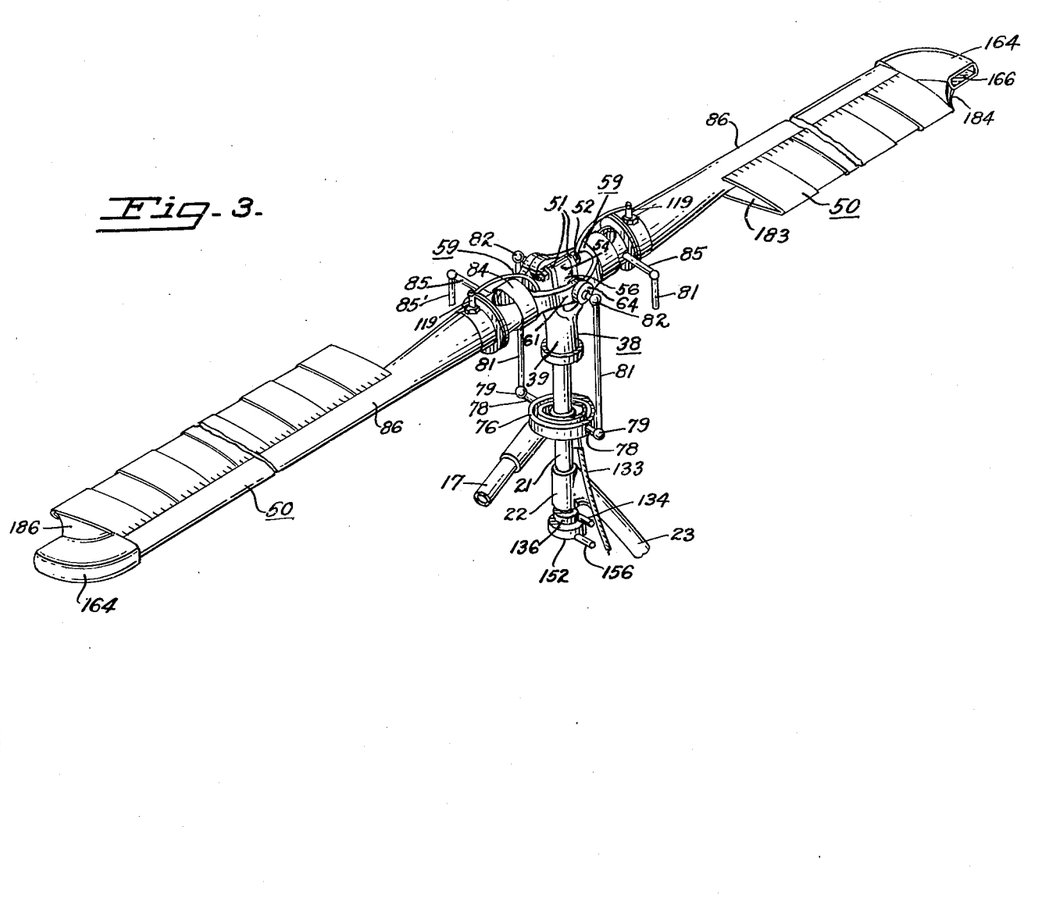
Fig. 3 is an isometric, more or less schematic view of the wing mounting and rotor head construction.

The rotor structure illustrated is in principle a well known type having a pair of diametrically opposite rotor wings or blades 50; each wing being universally mounted so that it can roll about an axis extending generally longitudinally thereof for cyclic pitch adjustment, and also so that it can pivot or flap about an axis transverse to the pitch adjustment axis for end to end tilting or teetering of the wing. Any suitable means may be provided for such type of rotor wing mounting. The form of construction illustrated comprises an upstanding forked portion 51 formed integral with and at the upper end of rotor head 38.

Secured in fork 51 is a pivot pin 52 which extends along an axis generally longitudinally of the axis of the wings 50. Journalled on spaced bearings 53 on pivot pin 52 is a sleeve 54 having a depending arm 56 positioned between the prongs of fork 51, and which is provided with lateral bosses 57 in which is fixed a shaft 58, the axis of which is at a right angle to the pivotal axis of pin 52.

Figure 6:
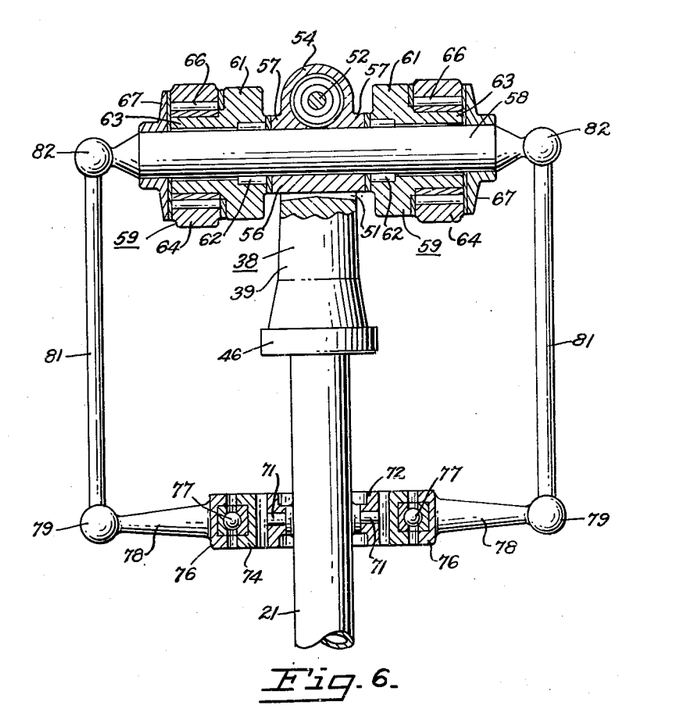
Fig. 6 is a fragmentary sectional view taken in a plane indicated by line 6—6 of Fig. 4.

As can be seen more clearly from Figs. 3 and 6, shaft 58 provides means for journalling the diametrically opposite wings 50 of the ship. In this connection, the root end of each wing 50 is secured in a manner which will be described more fully hereinafter, to a fork member 59; and each fork 59 straddles rotor head 38, and is pivoted on shaft 58. One prong of each fork 59 terminates in a bearing 61 journalled on a roller bearing 62 on shaft 58. A laterally projecting sleeve 63 is provided on each bearing 61; and the other prong of each fork is provided with a bearing 64. Each bearing 64 of each fork is journalled about a sleeve 63 of the other fork, and a roller bearing 66 is provided between each bearing 64 and each sleeve 63. Forks 59 are held in position by end thrust collars 67 fixedly mounted on the shaft 58.

From the preceding, it is seen that wings 50 are pivoted as a unit for pitch adjustment about the axis of pivot pin 52, to thus provide for cyclic pitch adjustment, while each of the wings can flap independently about a transverse axis at a right angle to the axis of pivot pin 52, namely, the axis of shaft 58. Thus, when cyclic pitch control is imparted to the wings, they will automatically assume a flapped position in a well known manner, depending upon the amount of cyclic pitch as controlled by the pilot.

A more or less conventional cyclic pitch control or wobble mechanism is provided for controlling the cyclic pitch under the control of the operator. Such mechanism comprises a pair of diametrically opposite pivot pins 71 secured to column 21 (only one of which is seen in Fig. 4) and upon which is journalled a gimbal ring 72. At a right angle to the axis of pivot pins 71 and secured to gimbal ring 72 are another pair of diametrically opposite pivot pins 73 upon which is journalled an intermediate ring 74. Ring 72 and pivotal mountings 71 and 73 provide a universal mounting for ring 74 enabling it to be tilted in any direction under the control of the pilot's control stick 17 which is fixedly secured to ring 74; ring 74 being non-rotatable. About ring 74 is an outer ring 76 of the wobble mechanism, which is rotatably mounted on inner ring 74 by ball bearings 77. Extending from diametrically opposite portions of outer ring 76 and in the same plane as shaft 58 is a pair of laterally extending arms 78 which are provided with universal joint connections 79 with upwardly extending rods 81 in turn universally connected at 82 to the ends of shaft 58.

The described connections between outer ring 76 of the wobble mechanism and shaft 58 cause the outer ring of the wobble mechanism to rotate with rotor head 38; and since inner ring 74 of the wobble mechanism is non-rotatable, it is seen that control of the angle of tilt thereof by the operator can be effected during rotation of the rotor. When the wobble mechanism is tilted to any given or predetermined position by the pilot, the pitch of the wings will be adjusted throughout the entire range of 360° by virtue of the pivoting of the wings on pivot pin 52; and as previously explained, this will cause the wings to flap about the axis of shaft 58.

Any suitable mechanism may be provided for imparting collective pitch to wings 50 for altitude control. A suitable mechanism for this purpose comprises forming each wing fork 59 in two sections, the outboard section 83 of which is journalled for rotation relative to the inboard section 83', by means of a bearing 84; so that the associated wing 50 can be turned generally about its longitudinal axis independently of the cyclic pitch adjustment. Torsion rods 84' are provided to take up end thrust, and at the same time permit turning of the wing. A lever 85 is connected to each outboard section 83; and levers 85 are connected by suitable linkage 85' to conventional actuating mechanism (not shown) which is actuated through the previously mentioned pilot operable collective pitch control lever 18.

Various types of wing structures may be employed, and preferred types which have been utilized will be described in detail hereinafter. In all embodiments of the wing structure, the principle is employed of providing an interior longitudinally extending passage in each wing 50, which forms the exhaust passage of a jet pulse motor, the head of which is located at the root end of the wing; the wing being formed adjacent its tip with a chordwise directed jet expulsion port. Such exhaust passage for the jet motor is formed by relatively long jet motor tail piping 86 which also provides the main spar structure of the wing; and the root end portion of the spar or tail piping provides a firing chamber 87 for the jet motor.

With reference to Figs. 4 and 5 it will be noted that the root end of each spar 86 is secured to an associated fork 59 by means of a ring 91 welded to the spar adjacent the root end thereof and against one side of which is clamped a ring 92 by means of securing bolts 93. At the other side of ring 91, bolts 93 are secured to an annular flange 94 integral with fork 59, thus fixing the wing spar to the fork. Fork 59 is also formed with an inwardly extending annular shoulder 96 which clamps a circular plate member 97 against the root end 98 of the spar. Plate 97 provides supporting means for a plurality of more or less conventional jet pulse motor head units 99 which form the jet motor head for the wing and are arranged circumferentially about the plate; the head units 99 being preferably formed integrally with plate 97.

Each jet motor head unit 99 is formed at its discharge end with a plurality of circumferentially arranged ports 101; and the ports are controlled by spring steel flapper valves 102, each of which consists of an integral plate 102' having radially extending valve members as can be seen more clearly from Fig. 5. Each valve plate 102' is clamped against the discharge end of the associated head unit 99 by a conically shaped valve stop member 103 secured to unit 99 by a screw 104.

Fuel is supplied to each jet motor head unit 99 by a conduit 106 having discharge ports 107 located within the unit. A common source of fuel supply is provided for all of units 99 through throttling needle valve housing 108 which is mounted, preferably by welding, on the center of plate 97. At its inner end valve housing 108 is provided with a chamber 109 connected by flexible hose connection 111 to a source of fuel supply which will be described more fully hereinafter. A valve seat 112 is provided in housing 108 adjacent an end of chamber 109; the port of seat 112 being controlled by adjustable needle valve 113 having a screw threaded connection 114 on housing 108, and being adjustable manually outside of housing 108 by knurled wheel 116. At the side of seat 112 opposite chamber 109, is another chamber 117 into which fuel can flow from chamber 109. Chamber 117 is connected by means of a plurality of radially extending pipes 118 to the jet motor units; each of pipes 118 being in turn connected to an associated fuel conduit 106 of the jet motor unit.

In starting the jet motors, an ignition or spark plug 119 is required. Such plug is mounted on the wall of firing chamber 87 and is connected by flexible ignition cable 121 to a source of current in a manner to be described more fully hereinafter.

Compressed air is also required in starting the jet motors. For this purpose, an annular manifold pipe 122 is mounted within each fork 59 and surrounds all jet motor units 99. Pipe 122 is connected by flexible hose 123 to a source of compressed air which will also be described more fully hereinafter; and a plurality of conduit members 124, one for each jet motor unit 99, is connected to manifold pipe 122. The discharge end of each conduit member 124 is so directed as to introduce the compressed air into the associated jet motor unit 99.

For supplying the current to the spark plug 119, the end of ignition cable 121 adjacent rotor head 38 is secured by a screw 126 to nut 46; a contact plate member 127 being secured by screw 126 and being insulated from nut 46 by insulation 128. By the described mounting, it can be seen that ignition cable 121 can rotate with the rotor; and at the same time contact plate 127 can pick up the current from a contact plate 129 which is fixedly secured to rotor column 21 by screw 131; contact plate 129 being insulated through insulation 132. Screw 131 also connects a second ignition cable 133 to contact plate 129, and cable 133 is in turn connected to ignition coil 13 in any suitable manner (not shown). The ignition coil which is a well known construction may be turned on or off by any suitable control member manipulatable by the pilot in a well known manner.

The supply of compressed air to flexible hose 123 is provided by the following arrangement. Compressed air tank 11 is connected by piping 134 to a gland 136 fixedly secured about the lower end of hollow column 21; suitable packing 137 being provided to seal the gland. Gland 136 has an annular chamber 138 from which the air passes into the inside of column 21 through ports 139 provided in the column. The air can thus flow upwardly through the column; and adjacent its upper end, the column is provided with ports 141 from which the air can flow outwardly into an annular chamber 142 formed between the column and rotor head 38, and to which flexible air hose 123 is connected. By operation of a hand manipulatable valve (not shown) on the compressed air tank 11, a supply of compressed air can be introduced to the jet motors, at the will of the operator, for starting operations.

When the rotor is at rest, fuel is supplied for starting purposes by operation of hand operable pump 14 through manipulation of lever 16 in the manner previously described. However, during rotation of the rotor, means is provided to feed a constant stream of fuel to the jet motors. For this purpose, a fuel supply pipe 143 is provided interiorly of column 21; its upper end being secured to rotor head 38 within a chamber 144 formed at the upper end of the rotor head above the column. Thus, fuel supply pipe 143 can rotate with the rotor for a purpose which will be explained later. Ports 146 are provided in the upper end of fuel pipe 143 and communicate with chamber 144; and flexible fuel supply hose 111 is connected to chamber 144. Consequently fuel flowing through pipe 143 can flow into hose 111 to supply the motors.

A bearing surface 147 is provided adjacent the upper end portion of fuel pipe 143 within column 21, in which the pipe can rotate; and the lower end of pipe 143 is rotatably mounted on a thrust bearing 148 seated on an inturned flange 149 formed at the lower end of the column. Secured to ears 151 on flange 149 is a fuel pump 152 of any conventional construction, which is sealed by packing 153; and fuel supply pipe 143 is provided with a reduced portion 154 which extends into the pump 152 to operate the same as the fuel supply pipe rotates. Pump 152 is connected by conduit 156 to the fuel tank 9. Thus, as the rotor rotates during flight of the ship, a constant source of fuel is supplied to the jet motors by virtue of the driving of pump 152 by the rotating fuel supply pipe 143. From the preceding, it is seen that the ignition conductor 121, the fuel supply means including hose 111, and the compressed air supply means including hose 123 are all mounted on the rotor and consequently rotate therewith. The connections to these supply parts for each jet motor are associated with the stationary rotor column 21 since they are mounted thereon.

The jet pulse motor for each wing operates in a conventional and well known manner. In starting the motors, fuel is first pumped by hand into the motors by operation of hand pump lever 16. The ignition is next turned on for spark plugs 119; and compressed air is then released from the compressed air tank 11. After the motors start firing, the current to the spark plugs 119 is turned off, the flow of compressed air is also shut off, and hand pumping of fuel is discontinued. The jet motors will then fire automatically through self ignition by virtue of the constant fuel supply effected through the fuel pump 152. In this connection, a suitable pilot operable throttling valve (not shown) may be provided for controlling the supply of fuel to the motors, in a well known manner, to control the power output thereof. Reaction of the jets from the chordwise directed jet expulsion ports results in rotation of the rotor wings, the pitch of which can be controlled by the pilot in the usual manner for directional control of the ship.

Various types of wing structures are illustrated in the drawings. As previously mentioned, in all embodiments of such wing structure, the wing comprises elongated tubing or piping which provides the tail piping of the jet motor and also serves as the main spar of the wing; the jet motor head as previously mentioned being mounted on and adjacent the root end of such piping. Such spar or tail piping provides a support for an airfoil skin of suitable material, preferably relatively light weight metal; and the skin is mounted on the spar for relative movement with respect thereto longitudinally of the wing to allow for expansion and contraction due to differences in temperatures which will exist in the tail piping and the airfoil under operating conditions.

In the embodiment of wing structure illustrated in Figs. 7 through 11, spar 86 consists of an integral pipe of highly heat resistant metal such as a heat treated steel alloy containing a relatively high percentage of nickel ("Inconel") of about 0.062 inch thick. Pipe 86 preferably tapers inwardly from the root end adjacent ring 91 where the jet motor head is mounted, to provide a narrowing Venturi throat portion 161 which is found desirable in enhancing the efficiency of the jet.

Figures 7, 9, 10, 11:
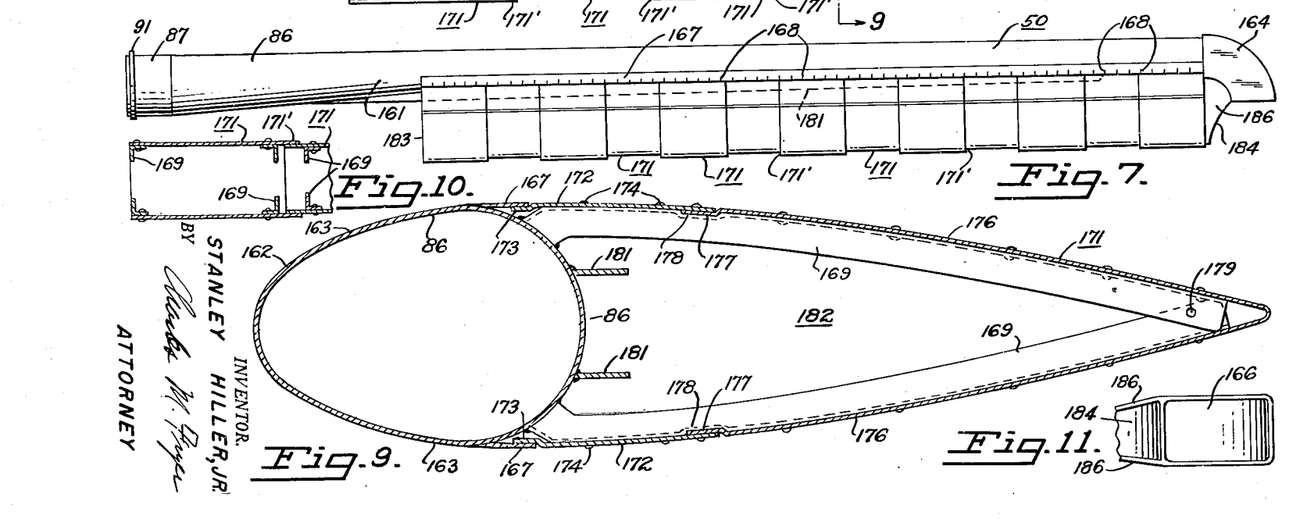
Fig. 7 is a plan view of one form of wing structure.
Fig. 9 is a transverse or chord section taken in a plane indicated by line 9—9 in Fig. 8.
Fig. 10 is a fragmentary section taken in a plane indicated by line 10—10 in Fig. 8.
Fig. 11 is a fragmentary elevation looking in the direction of arrow 11 in Fig. 8.

As can be seen from the section of Fig. 9, pipe 86 is generally elliptically shaped in cross-section along the wing section thereof, and one side 162 of the pipe is shaped to airfoil contour to form the leading edge portion of the wing. The upper and the lower surfaces 163 of the pipe also form portions of the upper and the lower surfaces of the wing. At the tip of pipe 86, is secured thereto, by welding or any other suitable means, an elbow member 164 which provides a chordwise directed jet expulsion port 166. Preferably, port 166 is rectangularly shaped in section as this has been found to produce most efficient reaction of the jet.

Figure 8:
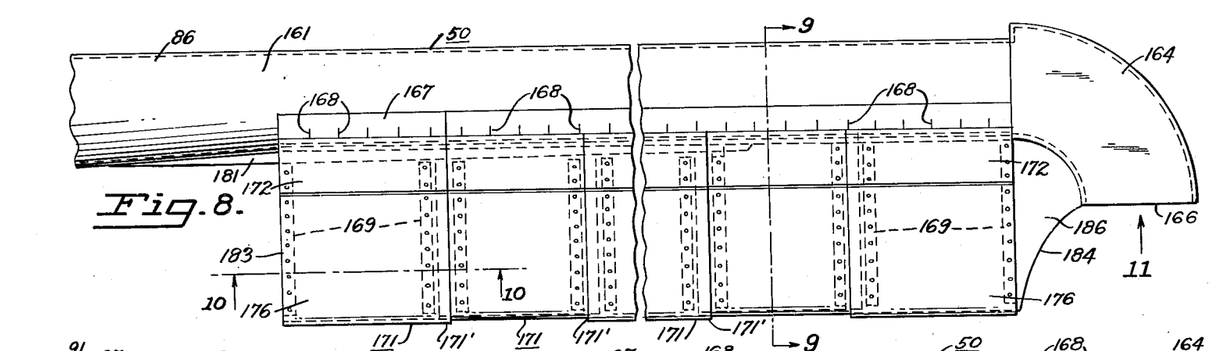
Fig. 8 is a similar fragmentary enlarged view with portions broken away and omitted from the view to illustrate more clearly the construction.

The remainder of the wing consists of an independent airfoil skin, of relatively light sheet metal, which comprises a plurality of independent but adjacent overlapping sections supported by the spar for relative movement with respect thereto and with respect to each other. To protect the airfoil skin from the heat generated in spar 86, upper and lower longitudinally extending strips 167 forming part of the airfoil skin and of highly heat resistant metal, such as "Inconel" of about 0.030 inch thick, are welded to the upper and lower surfaces of pipe 86, and extend the major portion of the wing from adjacent throat portion 161 to adjacent the tip of the wing. As some warping may occur because of the heat, each strip 167 is provided with a plurality of closely spaced chordwise directed slots 168 along the entire length thereof which provide expansion and contraction relief to thus preclude possible buckling of the strips.

The remainder of the airfoil skin is secured to bracing in the form of transversely extending ribs 169 which are also of highly heat resistant metal, such as "Inconel" metal, of about 0.025 inch thick; the inner ends of such ribs being welded to the trailing side of the spar piping 86. Ribs 169 are each preferably in the form of angle members. The remainder of the airfoil skin comprises a plurality of independent sections 171 which freely overlap at 171' and extend longitudinally of the wing to allow for relative expansion and contraction and also growth; and each section 171 is secured only to a pair of laterally spaced ribs.

The front portion of each skin section 171 comprises an upper and a lower piece of sheet metal 172 also of highly resistant metal, such as "Inconel" of about 0.025 inch thick; and the inner edge of each sheet 172 is provided with a sliding or free underlapped joint 173 with the adjacent edge of a strip 167; each sheet 172 being secured to a pair of adjacent ribs by any suitable means such as rivets 174. Because of the free lap joints 173, further relief for expansion and contraction is provided; and the highly heat resistant strips 172 provided enhanced protection against the heat generated in the jet motor tail piping.

The rear portion of each airfoil skin section 171 consists of a sheet of relatively thin aluminum 176, preferably about 0.020 inch thick, which is bent over the ribs. Both the upper and lower inner edges of sheet 176 are provided with lap joint connections 177 with the outer edges of strips 172; the ribs being provided with suitable relief 178 to accommodate the joints 177. Sheet 176, including lap joint connections 177, is riveted to the ribs in the same manner as sheets 172; and the rear or trailing edges of ribs 169 are riveted together by rivets 179.

To protect the tail piping 86 against possible buckling or warping, a plurality of fins 181 of highly heat resistant metal, such as the same metal employed for the pipe 86, are secured by welding to the rear or trailing side of pipe 86 within the interior passageway 182 adjacent the pipe and which is formed by the airfoil skin. Fins 181 extend from adjacent throat portion 161 toward the tip of the wing along substantially the entire wing length of pipe 86. It is to be noted that the fins taper slightly in width toward the tip of the wing; being about ⅛ inch narrower at the tip end thereof. This is for the purpose of allowing substantially equal growth of the fins with the piping 86, as these members gradually increase in size because of the slight but permanent growth which occurs in metal subject to high temperatures.

Fins 181 not only protect against warping but also serve as cooling members. In this connection, passageway 182 provides a cooling duct for flow of cooling air which enters through the open end 183 of the airfoil skin adjacent the root end of the wing, and flows through the wing due to the action of centrifugal force as the wing rotates and discharges through the open end 184 at the tip of the wing and adjacent jet expulsion port 166; such open end 184 being shrouded at the top and bottom by a shroud structure 186. This continual mass of flowing air serves as a cooling medium for the trailing side of the jet motor tail pipe and wing spar structure; the leading and top sides thereof being cooled by their movement through the air as the rotor rotates.

In Figs. 12 through 15 is shown another embodiment of the wing structure employing the general principles pointed out with respect to the previous modification. In such embodiment, the airfoil skin, although not made of sections permitting independent expansion and contraction of the various sections relative to the combined wing spar and jet motor tail piping, is also mounted for relative expansion and contraction with respect to such piping. The root end portion 191 of the tail piping is substantially of the same design and of the same material as that of the previously described modification, having relatively narrow throat portion 192. Root portion 191 is welded adjacent its outer end to a pair of spaced apart pipes 193 of the same highly heat resistant metal previously mentioned, both of which form part of the jet tail piping. At the tip of the wing, pipes 193 are curved chordwise to provide the chordwise directed jet expulsion ports 194.

Figures 12, 13:
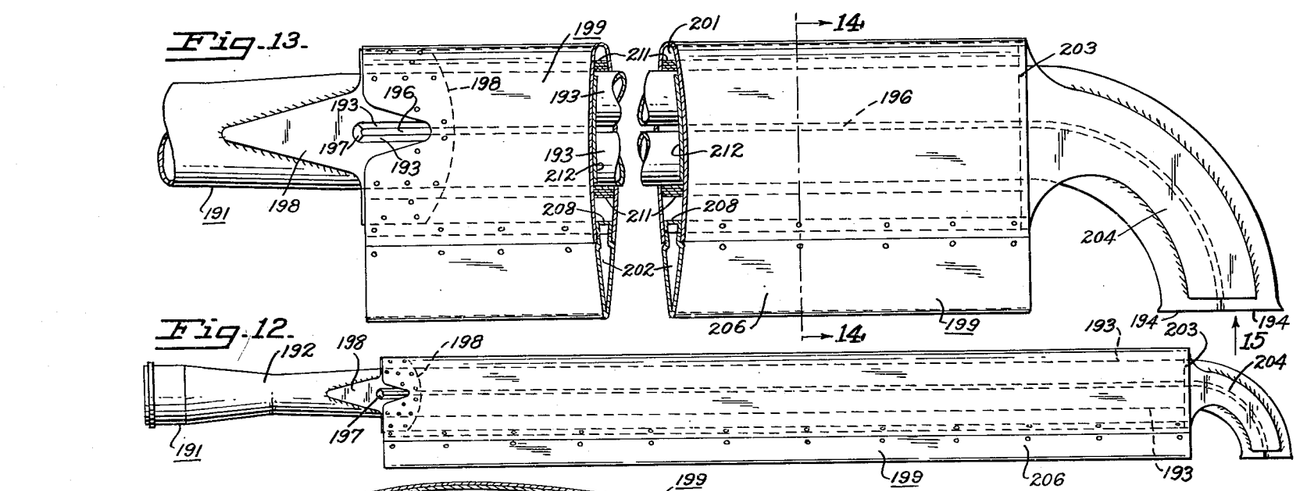
Fig. 12 is a plan view of another embodiment of wing structure.
Fig. 13 is a similar fragmentary enlarged view with portions broken away and omitted from the view to illustrate more clearly the construction.
Figure 14:
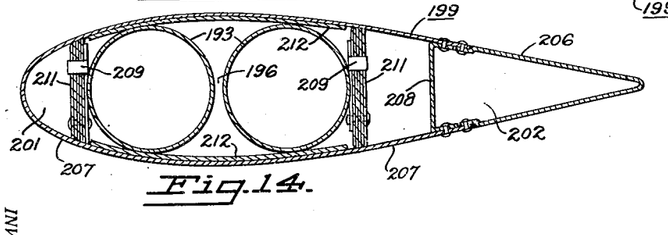
Fig. 14 is a transverse or chord section taken in a plane indicated by line 14—14 in Fig. 13.
Figure 15:
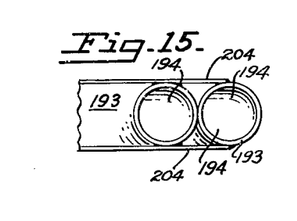
Fig. 15 is a fragmentary elevation looking in the direction of arrow 15 in Fig. 13.

At the junction between root portion 191 and pipes 193, the pipes are of lesser height, so that air can enter through apertures 197 formed in upper and lower cuffs 198 welded to root portion 191, and flow through a passageway 196 between the pipes. These cuffs provide means for attachment of the airfoil skin 199 which is riveted thereto and surrounds completely the tail piping so as to provide both a passageway 201 inside the skin along the leading edge of the wing and a passageway 202 inside the skin along the trailing edge of the wing. The root and tip ends of airfoil skin 199 are open to allow flow of cooling air through the passageways 201 and 202. At the tip portion, skin 199 is slidably supported at 203 on upper and lower plates 204 welded to the curved portions of pipes 193.

Skin 199 comprises a trailing edge portion 206 formed of a single sheet of aluminum bent to the proper contour and of about 0.016 inch thick, and a main body portion 207 which is also of a single sheet of aluminum of about 0.040 inch thick, which is bent over the pair of pipes 193 to provide the leading edge and the upper and lower surfaces of the wing. The trailing edges of main skin portion 207 are riveted to and extend beyond a channel member 208 which extends substantially the entire length of the skin; and the trailing edge portion 206 of the skin is riveted to the projecting ends of main portion 207.

For further support of the skin by the tail piping, clips 209 of highly heat resistant metal are secured to each of pipes 193 along the length thereof by welding; and these clips fixedly support longitudinally extending spar members 211 which extend the length of the skin and slidably support both the upper and the lower faces of the skin. Spar members 211 are each formed of a laminated structure of highly heat resistant material, such as hard asbestos sheeting. To insulate the upper and lower faces of the skin 199 from pipes 193, the undersides of such faces are covered by asbestos heat insulating lining sheets 212 adhesively secured thereto.

Since spar members 211 are not fixedly secured to the airfoil skin but slidably support the same, and because the skin is secured only to cuffs 198 and is slidably mounted at 203, the entire skin can expand longitudinally of the wing structure to allow for differences of temperature between it and the tail piping; and at the same time, the spar members 211 through piping 193 provide a firm support for the entire skin structure.

Figures 16, 18, 19, 20:
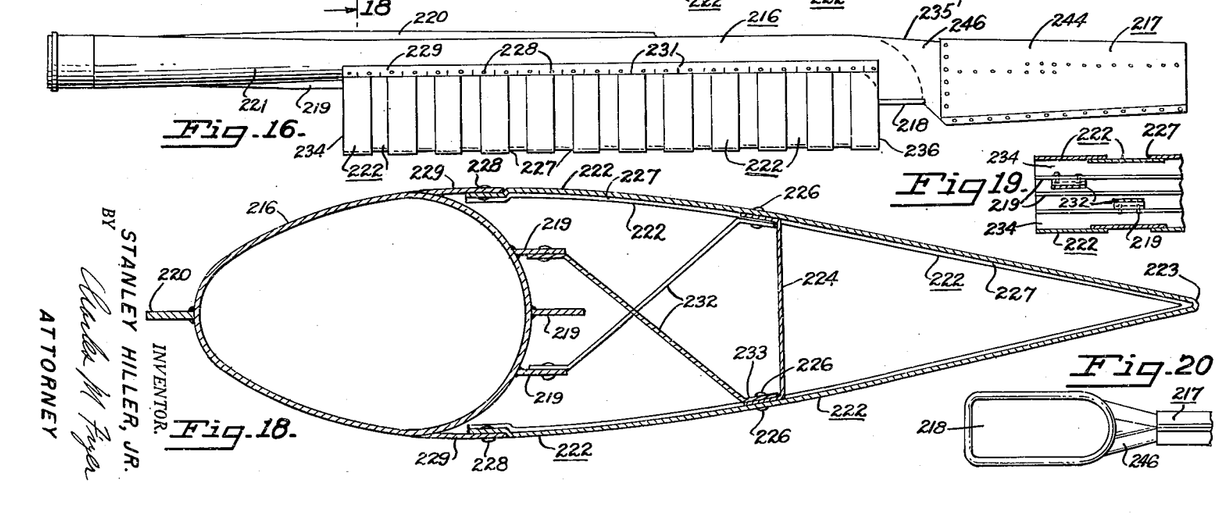
Fig. 16 is a plan view of a third and preferred embodiment of wing structure.
Fig. 18 is a transverse or chord section taken in a plane indicated by line 18—18 in Fig. 17.
Fig. 19 is a fragmentary section taken in a plane indicated by line 19—19 in Fig. 17.
Fig. 20 is a fragmentary elevation looking in the direction of arrow 20 in Fig. 17.

In the modification of Figs. 16 and 20 which is a preferred construction for reasons which will be discussed, jet motor tail pipe 216 has the same chord section embodied in the modification of Figs. 7 to 11 and is of the same material. However, such tail pipe does not extend substantially the entire length of the wing, as a separate airfoil section or unit 217 forms the tip end portion of the wing beyond the chordwise directed jet expulsion port 218. This port is, however, located adjacent to but spaced inwardly from the wing tip at substantially the so-called mean center of drag of the wing, which is at a distance from the root end of the wing of about 70% to 75% of the total length of the wing.

By locating port 218 at the position described, several important advantages are obtained. First of all, with the jet expulsion port located directly at the tip of the wing, a certain amount of reaction drag exists which tends to cause uncontrolled rolling or pitch change of the wing, but this is eliminated by the present construction. Also, vibration is eliminated which might otherwise occur due to unbalanced forces; and cyclic pitch control of the blade is made easier because the described location provides a more or less neutral position for the jet expulsion, which therefore does not react back to the control stick.

Figure 17:
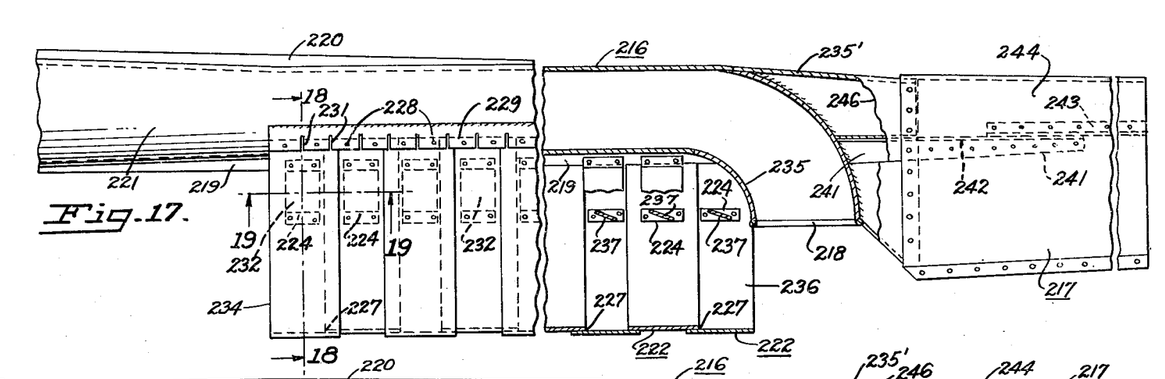
Fig. 17 is a similar fragmentary enlarged view with portions broken away and omitted from the view to illustrate more clearly the construction.

As with respect to the previously described modification of Figs. 7 to 11, a plurality of cooling and anti-warping strips 219, of the same material previously described, are welded to the trailing face of jet motor tail pipe and wing spar 216. These strips extend from adjacent throat portion 221 of the tail pipe 216 to a position adjacent the jet expulsion port 218; and as described with respect to the previous modification, the strips taper slightly inwardly toward the wing tip. Preferably, three such strips 219 are employed, although a lesser number may be used as in the previous modification, or even a greater number if necessary. In addition, an anti-warping strip 220 is preferably welded to the leading face of spar 216, and extends to a position substantially at the midpoint of the airfoil portion of the wing. The skin which provides the airfoil is different in some details from that previously described with respect to Figs. 7 to 11, although its construction and bracing therefor are the same in principle. Such airfoil skin, as with respect to the previous modification, is also formed of a plurality of overlapping independent sections 222 which extend to a position adjacent jet expulsion port 218, thus allowing for relative expansion and contraction lengthwise of the wing in the manner previously related. Each section 222 comprises a single sheet or strip of stainless steel of about 0.025 inch thick bent at 223 to form the trailing edge of the wing; and each strip is secured to a bracing channel 224 of similar material, by any suitable means such as rivets 226. Each channel 224 extends lengthwise of the associated section 222 but not the entire length of the wing; and adjacent wing sections 222 overlap each other at 227.

At its forward edges, each section 222 is secured to, by any suitable means such as rivets 228, and laps upper and lower strips 229 of the highly heat resistant metal, such as "Inconel" of about 0.037 inch thick. Strips 229 are provided with closely spaced chordwise directed slots 231 and are welded to tail pipe 216; the strips 229 and the slots therein serving the same purpose as the strips 167 and its slots.

As additional bracing for each section 222, a diagonally extending strip 232 of about 0.025 inch thick stainless steel, is secured by riveting between an anti-warping strip 219 and one of flanges 233 of channel 224. With reference to Fig. 18, it will be noted that the bracing strips in any pair of adjacent wing sections 222 are arranged so that one strip is secured to an upper channel flange 233 and to a lower anti-warping strip 219, while the strip in the adjacent section is secured to a lower channel flange 233 and to an upper anti-warping strip 219. Thus adjacent strips 232 of adjacent wing sections 222 cross each other in diagonal relationship to provide strong bracing.

By the described arrangement, air can be sucked in through the open end 234 of the wing adjacent the root, and can flow through the passageway inside of the wing and out through open end 236 in the manner previously related, to provide for cooling of the trailing face of the tail pipe and spar. In this connection, the preferred construction does not present chordwise directed upright flanges of considerable width which exist with respect to the angle ribs in the construction of Figs. 7 to 11. Consequently, cooling air can flow through the inside of the wing without turbulence, which is a desirable feature.

Jet expulsion port 218 is formed by an elbow 235 which is welded to tail pipe 216 in an opening formed in the pipe adjacent end portion 235' of the pipe, such elbow being generally rectangularly shaped in cross section at its port end. The last few channels 224 of the wing adjacent jet expulsion port 218 are punched inwardly to provide air scoops or vanes 237 which serve to direct the air flowing between channels 224 and the trailing face of jet pipe 216 outwardly through open end 236 of the wing.

Any suitable mounting construction may be employed for the separate airfoil section 217 which forms the small tip portion of the wing beyond jet expulsion port 218. In the embodiment illustrated, such section 217 is supported on the end portion 235' of jet tail pipe 216 which projects beyond elbow 235 for discharge port 218. To such tail pipe portion 235' is secured, by any suitable means such as welding, a channel member 241; and to the web 242 of channel 241 is secured in back to back relationship the web of a second channel member 243, both of which channel members provide a wing spar extension. An airfoil skin 244 is riveted to the flanges of channels 241 and 243; the skin being of any suitable light weight sheet metal, such as aluminum. The space between elbow 235 and skin 244 is shrouded with sheet metal 246 of the highly heat resistant material which is riveted to skin 244 and welded to the elbow.

I claim:

1. A jet propelled helicopter comprising a rotor column, a wing mounted to rotate about the axis of said column, the wing having an independent airfoil skin and a tubular spar structure which provides tail piping of a jet motor, said independent skin having a floating support on said piping for relative movement with respect thereto, and a jet motor head mounted on said piping adjacent the root end of the wing.

2. A jet propelled helicopter comprising a rotor column, a wing mounted to rotate about the axis of said column, the wing having a tubular spar structure having a jet motor firing chamber adjacent the root end thereof and which provides tail piping of a jet motor, an independent airfoil skin having a floating support on said piping for relative movement with respect thereto, and a jet motor head mounted on said piping adjacent said firing chamber.

3. A jet propelled helicopter comprising a rotor column, a wing mounted to rotate about the axis of said column, said wing having a tubular spar structure having a jet motor firing chamber adjacent the root end thereof and which provides tail piping of a jet motor, an airfoil skin including a plurality of overlapping sections supported by said piping for relative movement with respect to each other longitudinally of the wing, and a jet motor head mounted on said piping adjacent said firing chamber.

4. A jet propelled helicopter comprising a rotor column, a wing mounted to rotate about the axis of said column, the wing having a tubular spar structure having jet motor firing chamber adjacent the root end thereof and which provides tail piping of a jet motor, an independent airfoil skin having a floating support on said piping for relative movement with respect thereto, said skin forming an interior passageway adjacent said piping for flow of cooling air for said piping, and a jet motor head mounted on said piping adjacent the root end thereof.

5. A helicopter wing adapted for jet propulsion comprising a tubular spar structure having a jet motor firing chamber adjacent the root end thereof and which provides tail piping for a jet motor head adapted to be mounted adjacent the root end of the wing, said piping having a chordwise directed jet expulsion port adjacent to but spaced inwardly from the tip of the wing at substantially the position of the mean center of wing drag, and an independent airfoil skin having a floating support on said piping for relative movement with respect thereto, said skin forming an interior passageway adjacent said piping for flow of cooling air for said piping.

6. A helicopter wing adapted for jet propulsion comprising a tubular spar structure having a jet motor firing chamber adjacent the root end thereof and which provides tail piping for a jet motor head adapted to be mounted adjacent the root end of the wing, said piping having a chordwise directed jet expulsion port adjacent to but spaced inwardly from the tip of the wing at substantially the position of the mean center of wing drag, an independent airfoil skin having a floating support on said piping for relative movement with respect thereto, said skin forming an interior passageway adjacent said piping for flow of cooling air for said piping, and a wing section providing the tip portion of the wing and supported by said piping.

7. A helicopter wing adapted for jet propulsion comprising a tubular spar structure having a jet motor firing chamber adjacent the root end thereof and which provides tail piping for a jet motor head adapted to be mounted adjacent the root end of the wing, said piping having a chordwise directed jet expulsion port adjacent the tip of the wing, and an independent airfoil skin comprising a plurality of overlapping sections having a floating support on said piping for relative movement with respect thereto, said skin forming an interior passageway adjacent said piping for flow of cooling air for said piping.

8. A helicopter wing adapted for jet propulsion comprising a tubular spar structure having a jet motor firing chamber adjacent the root end thereof and which provides tail piping for a jet motor head adapted to be mounted adjacent the root end of the wing, said piping having a chordwise directed jet expulsion port and being shaped at one side thereof to provide the leading edge portion of the wing, and an independent airfoil skin having a floating support on said piping for relative movement with respect thereto including upper and lower portions engaging respectively the upper and the lower surfaces of said piping, said skin comprising a plurality of overlapping sections and having an interior passageway adjacent said piping for flow of cooling air for said piping.

9. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower portions engaging respectively the upper and the lower surfaces of said piping, said skin comprising a plurality of overlapping sections and having an interior passageway adjacent said piping for flow of cooling air for said piping, and an anti-warping strip secured to and extending longitudinally of said piping within said cooling air passageway.

10. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower strip portions extending longitudinally of said piping and secured respectively to the upper and lower surfaces of said piping, each of said strips being provided with a plurality of spaced apart chordwise directed slots, the upper and the lower surfaces of the remainder of said skin lapping said upper and lower strips respectively, and said skin forming an interior passageway adjacent said piping for flow of cooling air for said piping.

11. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower strip portions extending longitudinally of said piping and secured respectively to the upper and lower surfaces of said piping, each of said strips being provided with a plurality of spaced apart chordwise directed slots, the upper and the lower surfaces of the remainder of said skin lapping said upper and lower strips respectively, said skin forming an interior passageway adjacent said piping for flow of cooling air for said piping, and a plurality of anti-warping strips secured to and extending longitudinally of said piping within said cooling air passageway.

12. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower strip portions extending longitudinally of said piping and secured respectively to the upper and lower surfaces of said piping, each of said strips being provided with a plurality of spaced apart chordwise directed slots, the upper and the lower surfaces of the remainder of said skin lapping said upper and lower strips respectively, said remainder of said skin comprising a plurality of overlapping sections, bracing for each section supported by said piping to which such section is secured, and said skin forming an interior passageway adjacent said piping for flow of cooling air for said piping.

13. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower strip portions extending longitudinally of said piping and secured respectively to the upper and lower surfaces of said piping, each of said strips being provided with a plurality of spaced apart chordwise directed slots, the upper and the lower surfaces of the remainder of said skin lapping said upper and lower strips respectively, said remainder of said skin comprising a plurality of overlapping sections, said skin forming an interior passageway adjacent said piping for flow of cooling air for said piping, a plurality of anti-warping strips secured to and extending longitudinally of said piping within said cooling air passageway; and bracing for each of said skin sections comprising a channel member having flanges to which the upper and the lower surfaces of such skin section are secured, and a diagonally extending strip secured to a flange of said channel member and to an anti-warping strip.

14. A helicopter wing adapted for jet propulsion comprising a tubular spar structure which provides tail piping for a jet motor head adapted to be mounted adjacent the root end of the wing, said piping having a chordwise directed jet expulsion port and being shaped at one side thereof to provide the leading edge portion of the wing, an airfoil skin supported by said piping for relative movement with respect thereto including upper and lower strip portions extending longitudinally of said piping and secured respectively to the upper and lower surfaces of said piping, each of said strips being provided with a plurality of spaced apart chordwise directed slots, the upper and the lower surfaces of the remainder of said skin lapping said upper and lower strips respectively, said remainder of said skin comprising a plurality of overlapping sections, said skin forming an interior passageway adjacent said piping for flow of cooling air for said piping, a plurality of anti-warping strips secured to and extending longitudinally of said piping within said cooling air passageway; and bracing for each of said skin sections comprising a channel member having flanges to which the upper and the lower surfaces of such skin section are secured, and a diagonally extending strip secured to a flange of said channel member and to an anti-warping strip, the securing of the diagonally extending strips of adjacent sections being such that they cross each other.

15. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping having a chordwise directed jet expulsion port and tapering inwardly from adjacent said root end to provide a Venturi throat portion adjacent said root end, and an independent airfoil skin having a floating support on said piping for relative movement with respect thereto.

16. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping having a chordwise directed jet expulsion port and tapering inwardly from adjacent said root end to provide a Venturi throat portion adjacent said root end, and an independent airfoil skin having a floating support on said piping for relative movement with respect thereto, said skin forming an interior passageway adjacent said piping and having an opening adjacent both the root end and the tip of the wing for flow of cooling air for said piping.

17. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping having a chordwise directed jet expulsion port and tapering inwardly from adjacent said root end to provide a Venturi throat portion adjacent said root end, an independent airfoil skin having a floating support on said piping for relative movement with respect thereto, said skin forming an interior passageway adjacent said piping and having an opening adjacent both the root end and the tip of the wing for flow of cooling air for said piping, and an anti-warping strip secured to and extending longitudinally of said piping within said cooling air passageway.

18. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping being of airfoil contour along one side to form the leading edge portion of the wing and having a chordwise directed jet expulsion port at the end opposite the root end thereof, an independent wing skin structure along the opposite side of said piping between said expulsion port and said root end, and a second independent wing skin structure mounted on said port end of the piping and extending spanwise of the wing to locate said expulsion port inwardly from the tip of the wing at substantially the position of the mean center of wing drag.

19. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping being of airfoil contour along one side to form the leading edge portion of the wing and having a chordwise directed jet expulsion port at the end opposite the root end thereof, an independent wing skin structure along the opposite side of said piping between said expulsion port and said root end, said independent wing structure having a floating support on said piping for relative movement with respect thereto, and a second independent wing skin structure mounted on said port end of the piping and extending spanwise of the wing to locate said expulsion port inwardly from the tip of the wing at substantially the position of the mean center of wing drag.

20. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping being of airfoil contour along one side to form the leading edge portion of the wing and having a chordwise directed jet expulsion port at the end opposite the root end thereof, said piping also tapering inwardly from adjacent said root end to provide a Venturi throat portion adjacent said root end, an independent wing skin structure along the opposite side of said piping between said expulsion port and said root end, and a second independent wing skin structure mounted on said port end of the piping and extending spanwise of the wing to locate said expulsion port inwardly from the tip of the wing at substantially the position of the mean center of wing drag.

21. A helicopter wing adapted for jet propulsion comprising a tubular spar structure having a jet motor firing chamber adjacent the root end thereof and which provides tail piping for a jet motor head adapted to be mounted on said piping adjacent said firing chamber, the piping being of airfoil contour along one side to form the leading edge portion of the wing and having a chordwise directed jet expulsion port at the end opposite the root end thereof, said piping also tapering inwardly from adjacent said root end to provide a Venturi throat portion adjacent said root end, an independent wing skin structure along the opposite side of said piping between said expulsion port and said root end, said independent wing structure having a floating support on said piping for relative movement with respect thereto, and a second independent wing skin structure mounted on said port end of the piping and extending spanwise of the wing to locate said expulsion port inwardly from the tip of the wing at substantially the position of the mean center of wing drag.

22. A helicopter wing adapted for jet propulsion comprising a tubular spar structure having a jet motor firing chamber adjacent the root end thereof and which provides tail piping for a jet motor head adapted to be mounted on said piping adjacent said firing chamber, said piping having a chordwise directed jet expulsion port, and an independent airfoil skin supported by said piping, said skin providing an open passageway adjacent said piping extending between the root end and the expulsion port end thereof for flow of cooling air along said piping.

STANLEY HILLER, Jr.

REFERENCES CITED

The following references are of record in the file of this patent:

UNITED STATES PATENTS

| Number | Name | Date |
| --- | --- | --- |
| 1,099,083 | Duc | June 2, 1914 |
| 1,519,444 | Fales | Dec. 16, 1924 |
| 2,397,357 | Kundig | Mar. 26, 1946 |
| 2,462,587 | Wilcox | Feb. 22, 1949 |
| 2,464,651 | Pecker | Mar. 15, 1949 |
| 2,469,480 | Sikorsky | May 10, 1949 |
| 2,472,917 | Nicolaeff | June 14, 1949 |
| 2,485,502 | McCollum | Oct. 18, 1949 |

FOREIGN PATENTS

| Number | Country | Date |
| --- | --- | --- |
| 423,590 | France | Feb. 20, 1911 |
| 648,107 | France | Aug. 7, 1928 |